Nov. 7, 1967    P. C. WARNER    3,351,535
MODERATOR CORES FOR NUCLEAR REACTORS
Filed Nov. 8, 1965    4 Sheets-Sheet 1

INVENTOR
P. C. WARNER
BY
Holcombe, Wetherill & Brisebois
ATTORNEY

Nov. 7, 1967  P. C. WARNER  3,351,535
MODERATOR CORES FOR NUCLEAR REACTORS
Filed Nov. 8, 1965  4 Sheets-Sheet 2

INVENTOR
P. C. WARNER
BY
Holcombe, Wetherill & Brisebois
ATTORNEYS 3,351,535
MODERATOR CORES FOR NUCLEAR REACTORS
Philip Cloudesley Warner, Wimbledon, London, England, assignor to United Power Company Limited, London, England, a British company
Filed Nov. 8, 1965, Ser. No. 506,719
Claims priority, application Great Britain, Nov. 13, 1964, 46,380/64
9 Claims. (Cl. 176—84)

This invention relates to a solid moderator core structure for nuclear reactors.

In nuclear reactor design it is necessary to ensure that the moderator core fulfils certain requirements. Two such requirements, which are of importance to the efficient operation of the reactor, concern voidage and dimensional properties. If excessive voidage is present in the core design, efficiency of the reactor will be impaired by the reduction of moderating effect. If the fuel elements undergo relative displacement as a result of Wigner strain in the moderator material, optimum operating conditions will not obtain at all times.

In low or medium rating reactors, geometrical layout of the core elements for good dimensional properties is fairly simple, and voidage can be kept low.

As high rating reactors became feasible, however, the problems set by Wigner strain become more difficult. This is partly because the absolute amount of strain becomes greater in the higher neutron fluxes experienced, but also because the resultant high flux gradients, for example near absorber masses, can cause differential strain between adjacent core elements and even within individual core elements. The consequent complication of the geometrical arrangement of the core elements leads to greater problems in the minimisation of voidage.

According to the present invention in a nuclear reactor, a moderator core assembly comprises in combination a plurality of closely spaced, adjacent columns of vertically aligned prismatic blocks, prism faces formed on said prismatic blocks, laterally adjacent blocks presenting juxtaposed parallel prism faces and keyways formed in said juxtaposed parallel prism faces, and a composite key assembly keying into said keyways comprising solid keys and longitudinally split keys, said solid keys spaced longitudinally along said keyways by said longitudinally split keys intermediate of said solid keys.

Preferably, each block is provided with at least two pairs of diametrically-opposed keyways and the directions defined by the corresponding diameters are the same for all blocks in the core structure.

Spacing blocks may be provided if the choice of prism so demands, and these may also be designed to co-operate with the keying system.

The invention will now be described with reference to the accompanying drawings, of which:

FIG. 1 shows a pair of prismatic reactor core blocks, 1a, 1b, provided with longitudinal keyways, 2a, 2b respectively. In practice, more than one keyway would be provided on each block, but one only is illustrated for the sake of simplicity.

Figure 1:
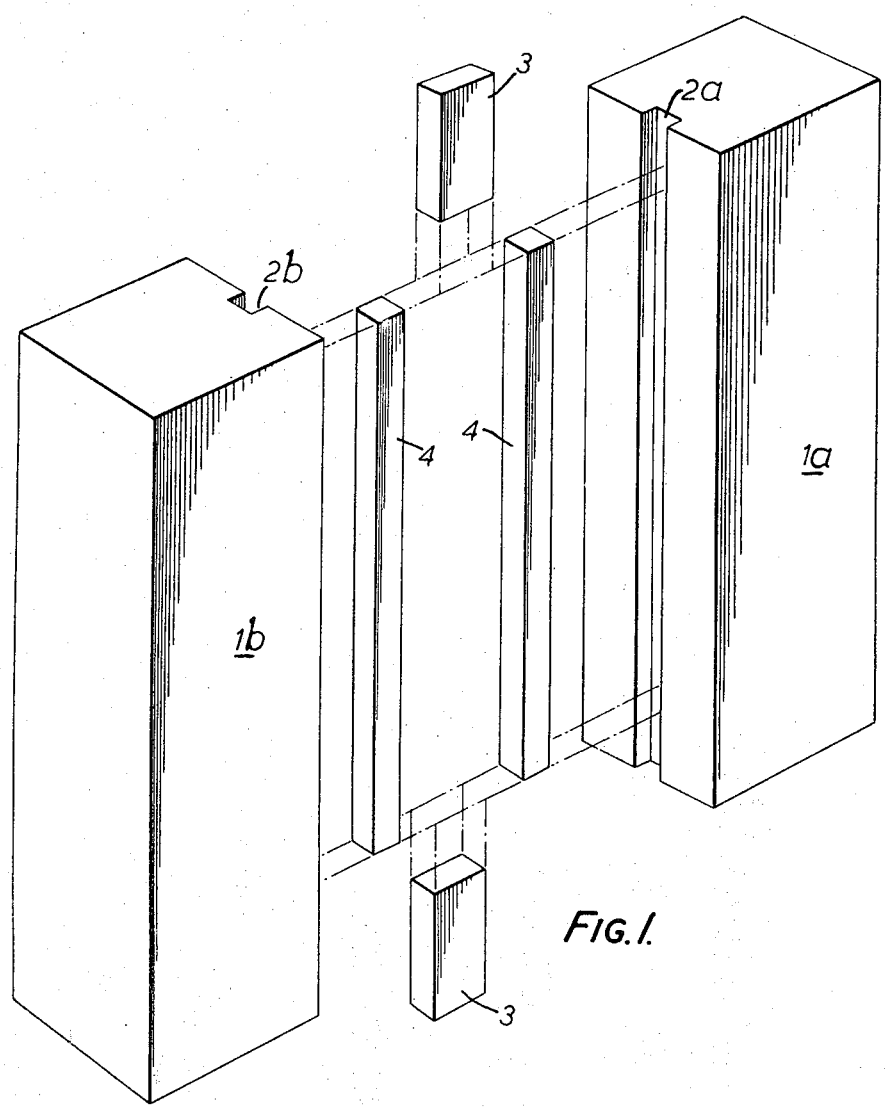
FIG. 1 is an exploded perspective view of an exemplary embodiment of the invention.

Associated with the opposed keyways 2a, 2b is a composite key assembly consisting of two "solid" keys 3 and a "split" key made up of two spacer portions 4. In the embodiment shown, the keyways 2a, 2b are of rectangular transverse cross-section, and the key parts 3, 4 are also of rectangular transverse cross-section in order to fit closely within the keyways with minimum voidage.

The "solid" keys 3 fit into both keyways 2a, 2b, and thus locate the block 1a, 1b, at spaced points, the distance between the points being determined by the length of the "split" keys positioned between the "solid" keys.

In the assembly of the blocks and keys shown in FIG. 1, the lower "solid" key 3 will be assumed to be projecting from the top face of an existing layer of blocks (not shown). The illustrated blocks are then assembled with their grooved prism faces in close-spaced parallel juxtaposition in such a way that the lower "solid" key 3 fits into both of keyways 2a and 2b. The "split" key portions 4 are then lowered into the keyways until they rest on the lower "solid" key 3. Each portion 4 enters one keyway only, and the length of each portion 4 is sufficiently smaller than the length of the blocks for the upper "solid" key to fit into the keyways with its lower end resting on the "split" key, and with its upper end projecting above the top surfaces of the blocks. The upper "solid" key 3 can then be used to locate a further layer of blocks in a similar manner to that already described for the lower "solid" key 3.

It will be noted that the blocks are only truly keyed to their laterally and vertically adjacent neighbours at their ends, and that the "split" keys serve merely as distance pieces between the "solid" keys and as "anti-voidage" means.

A two-tier assembly developed from the embodiment described above is shown in FIGS. 2 to 4.

Figure 2:
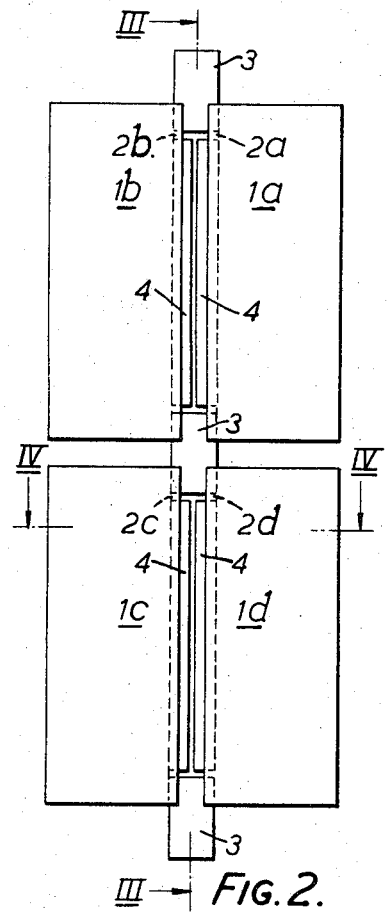
FIG. 2 is an elevation of an assembly developed from the structure of FIG. 1.
Figure 3A:
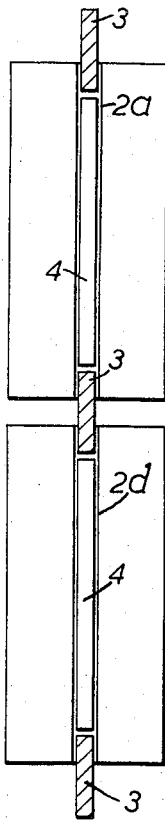
FIG. 3A is a section on the line III—III of FIG. 2.
Figure 4:
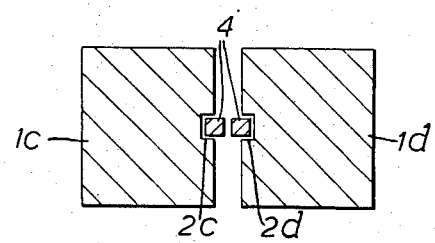
FIG. 4 is a section on the line IV—IV of FIG. 2.

FIGS. 2, 3A and 4 show a core assembly consisting of four blocks 1a, 1b, 1c and 1d together with the necessary keying devices, and as the structure is completely analogous to FIG. 1, it will not be described separately apart from pointing out that the components as shown slightly separated for the sake of clarity, and directing attention to the longitudinal gap between laterally adjacent "split" key portion 4 which is clearly shown in FIG. 2.

Figure 3B:
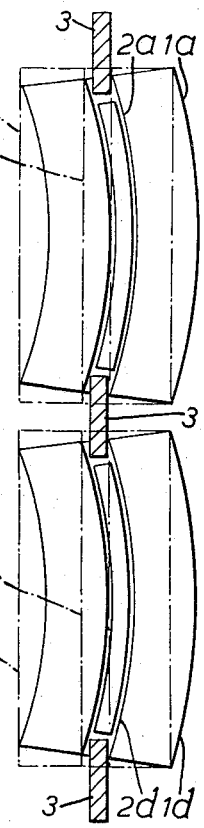
FIG. 3B is a section on the line III—III of FIG. 2 as it would appear after distortion of the core blocks.

In FIG. 3B, the results of differential strain of the blocks are illustrated. It is assumed that blocks 1b and 1c remain undistorted, and that blocks 1a and 1d have been strained into a curved formation by radiation effects. A further assumption, which will be discussed more fully below, is that the "solid" keys remain substantially vertically aligned.

It will be seen from FIG. 3B that, although the blocks 1a and 1d are distorted, the "solid" keys 3 are not in shear. Although the blocks 1a and 1d are shown in FIG. 3B as having undergone a very large deformation, this is only for the sake of clarity and in practice the strains involved are much smaller. Consequently, the keys will in practice be made a much closer fit in the keyways than shown in FIGS. 2 to 4, and will still not be subject to shear stress.

In the medial portions of the blocks, however, even the relatively small deformations experienced in practice would be sufficient to shear a well-fitting "solid" key. The provision of "split" keys avoids this difficulty, since the two "split" key portions 4 between any pair of blocks permit the central portions of those blocks to undergo relative movement as shown in FIG. 3B. This absence of rigid connection between the medial portions of adjacent blocks does not however, lead to voidage since, as illustrated in FIGS. 2 and 4, the "split" key portions 4 together substantially fill the keyways. This condition continues to apply when the blocks have become strained, since each of the two portions 4 of a "split" key remains in the keyway in the corresponding block and is deformed with the latter.

Figure 5:
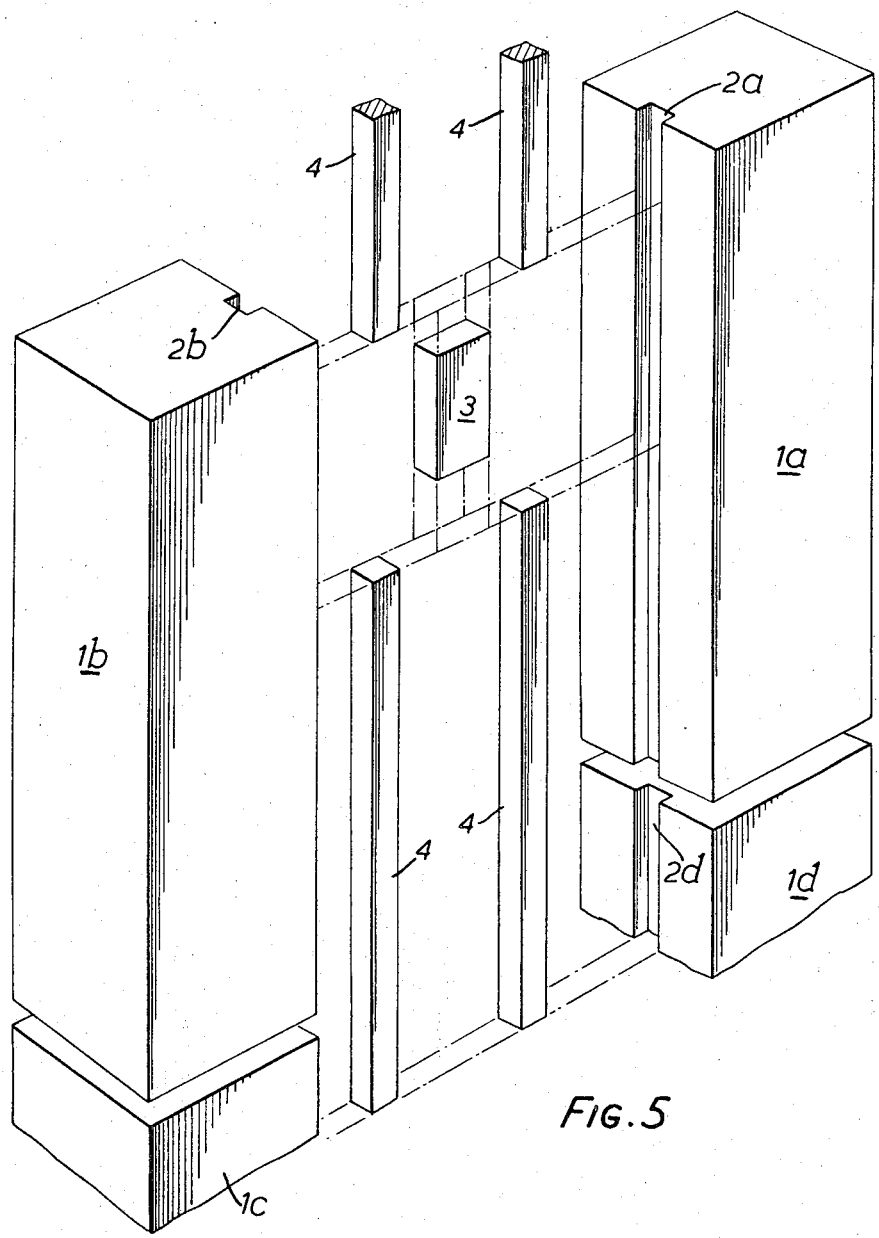
FIG. 5 is an exploded perspective view of another exemplary embodiment of the invention and, FIG. 6 is a plan view of a practical reactor core structure embodying the invention.

The "solid" keys 3 need not be located between vertically adjacent blocks as described above. The "solid" keys 3 can be located within the length of the blocks, vertical alignment then being obtained by means of the "split" keys. Such an arrangement is shown in FIG. 5. Vertically-aligned pairs of blocks 1a, 1d and 1b, 1c have the configuration described above with reference to FIG. 1 and are associated with "solid" keys 3 and "split" keys 4 as before. The "solid" keys 3 are located within the length of the blocks and are spaced apart by the "split" keys 4 which also bridge vertically-adjacent blocks.

The grooving of the moderator blocks uniformly along their length leads to several advantages. Firstly, there is a simplification in the manufacture of the blocks themselves which can be provided with keyways by a simple broaching process or a continuous milling process. Secondly, the provision of continuous vertical keyways running the entire height of the reactor core enables the structure to accommodate the large vertical strains which are likely to occur in a high rating reactor. The accommodation of these large vertical strains is further simplified by the fact that the columns of moderator blocks provided by the invention are of uniform transverse cross-section and can thus expand or contract in a vertical direction without any interference with neighbouring columns. Also, since each of the continuous vertical keyways in the core is occupied by either "solid" or "split" keys throughout its length, no appreciable voidage is introduced by the keying system.

The "split" keys may each be in several parts where this is more convenient for manufacture or assembly.

Figure 6:
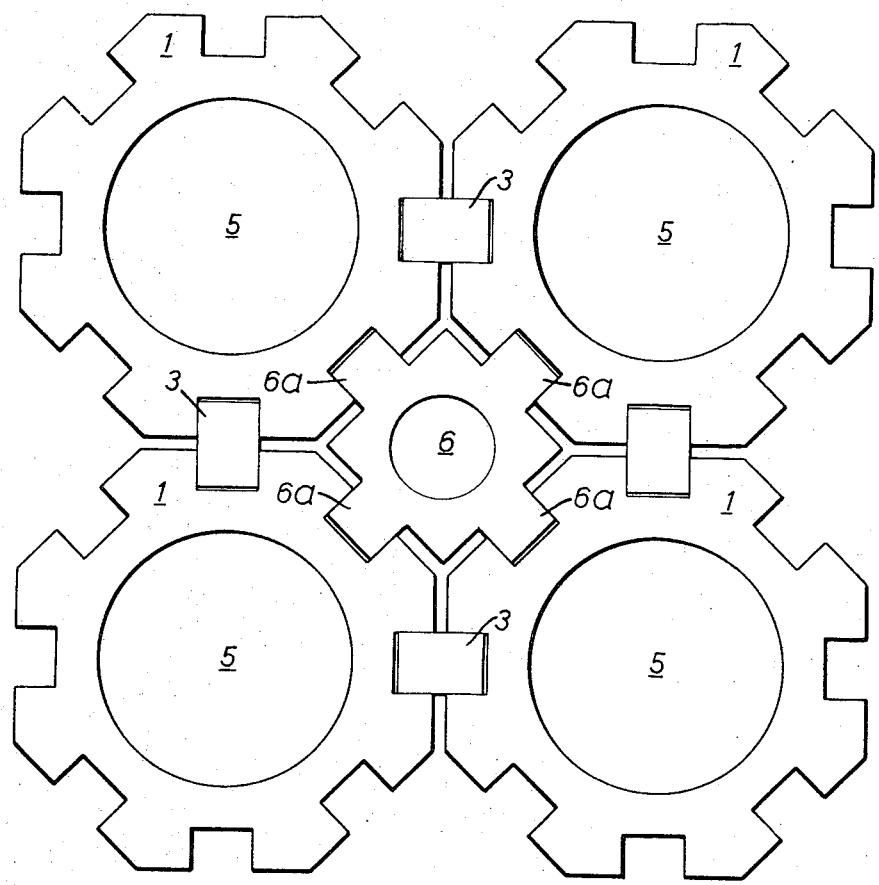

As pointed out above, the system illustrated above is purely exemplary and in practice the core blocks will be provided with more than one keyway each. A section of a practical arrangement is shown in FIG. 6. In this arrangement the moderator core blocks 1 are in the form of octagonal prisms and are bored at 5 to accommodate the fuel elements of the reactor. Each prism face of each block is longitudinally grooved along its mid-line, and the oppositely disposed grooves 2 on each pair of juxtaposed prism faces accommodate a composite key. The keys locating the blocks 1 relative to each other lie on orthogonal sets of lines viewed in plan, and provided all the peripheral blocks in a given layer of the core are positively located, for example by a restraint band, and the orthogonal lines intersect at the axes of the blocks, then the axes of the blocks will retain their relative spacings in spite of Wigner strain. If this condition is maintained at each level of the core, then the blocks will remain in substantially vertical alignment and, as stated above, the solid keys will also largely retain their original vertical alignment. It will be seen from FIG. 6 that a second type of core element, 6, is employed. This element 6 is axially bored to receive a control rod, monitoring probe or the like, and also reduces the voidage which would otherwise be present in a core constructed of octagonal prisms only. It is desirable to construct the element 6 in a manner similar to that used for the composite keys 3, 4. This would be achieved in the present case by using "solid" portions of the same section as that shown in FIG. 5 including the four keys 6a, and "split" portions each incorporating a central square-sectioned component and four separate key-like portions equivalent to the keys 6a.

Since the "solid" portion is keyed into the main core structure along two orthogonal lines intersecting at the axis of block 6, the latter will maintain its own place in the core structure and that of other components.

I claim:
1. In a nuclear reactor, a moderator core assembly comprises in combination,
 (i) a plurality of closely spaced, adjacent columns of vertically aligned prismatic blocks, prism faces formed on said prismatic blocks, laterally adjacent blocks presenting juxtaposed parallel prism faces and keyways formed in said juxtaposed parallel prism faces,
 (ii) a composite key assembly keying into said keyways comprising solid keys and longitudinally split keys, said solid keys spaced longitudinally along said keyways by said longitudinally split keys intermediate of said solid keys.

2. A moderator core assembly as claimed in claim 1 in which certain of said solid keys are positioned at the abutting positions of said vertically aligned blocks, said certain solid keys being inserted in said keyways of both said vertically aligned block faces and said juxtaposed opposite faces.

3. A moderator core assembly as claimed in claim 1 in which certain of said solid keys are positioned within the length of said blocks, vertically adjacent blocks in the same column being located by said split keys.

4. A moderator core assembly as claimed in claim 1 in which each of said prismatic blocks has at least four prism faces oppositely disposed in pairs.

5. A moderator core assembly as claimed in claim 2 in which each of said prismatic blocks has at least four prism faces oppositely disposed in pairs.

6. A moderator core assembly as claimed in claim 3 in which each of said prismatic blocks has at least four prism faces oppositely disposed in pairs.

7. A moderator core assembly as claimed in claim 1 in which said vertically aligned prismatic blocks are of regular octagonal prismatic form, said octagonal prismatic blocks being in a close-packed orthogonal array, said octagonal prismatic blocks defining the four sides of square prismatic orifices, further composite key assemblies keying into said square prismatic orifices, said further composite key assemblies comprising solid keys and longitudinally split keys, said solid keys occupying said square prismatic orifices and locating in said four keyways in said four faces of said four prisms defining said four sides of said square prismatic orifices, said solid keys being spaced longitudinally along said prismatic orifices by said longitudinally split keys intermediate of said solid keys.

8. A moderator core assembly as claimed in claim 2 in which said vertically aligned prismatic blocks are of regular octagonal prismatic form, said ogtagonal prismatic blocks being in a close-packed orthogonal array, said octagonal prismatic blocks defining the four sides of square prismatic orifices, further composite key assemblies keying into said square prismatic orifices, said further composite key assemblies comprising solid keys and longitudinally split keys, said solid keys occupying said square prismatic orifices and locating in said four keyways in said four faces of said four prisms of said four sides of said square prismatic orifices, said solid keys being spaced longitudinally along said prismatic orifices by said longitudinally split keys intermediate of said solid keys.

9. A moderator core assembly as claimed in claim 3 in which said vertically aligned prismatic blocks are of regular octagonal prismatic form, said octagonal prismatic blocks being in a close-packed orthogonal array, said octagonal prismatic blocks defining the four sides of square prismatic orifices, further composite key assemblies keying into said square prismatic orifices, said further composite key assemblies comprising solid keys and longitudinally split keys, said solid keys occupying said square prismatic orifices and locating in said four keyways in said four faces of said four prisms defining said four sides of said square prismatic orifices, said solid keys being spaced longitudinally along said prismatic orifices by said longitudinally split keys intermediate of said solid keys.

References Cited

UNITED STATES PATENTS

| | | | |
|---|---|---|---|
| 3,157,582 | 11/1964 | Babule et al. | 176—84 |
| 3,206,373 | 9/1965 | Dupuy | 176—84 |

FOREIGN PATENTS

| | | |
|---|---|---|
| 639,531 | 5/1962 | Italy. |
| 290,723 | 6/1965 | Netherlands. |

CARL D. QUARFORTH, *Primary Examiner.*

BENJAMIN R. PADGETT, *Examiner.*

M. J. SCOLNICK, *Assistant Examiner.*